United States Patent [19]

Bergquist et al.

[11] Patent Number: 4,671,484
[45] Date of Patent: Jun. 9, 1987

[54] GAS VALVE

[75] Inventors: Frank H. Bergquist, Wheaton; Donald W. Cox, Arlington Heights, both of Ill.

[73] Assignee: Eaton Corporation, Cleveland, Ohio

[21] Appl. No.: 852,562

[22] Filed: Apr. 16, 1986

[51] Int. Cl.$^4$ .............................................. F16K 31/70
[52] U.S. Cl. ........................................ 251/11; 251/78; 251/84; 431/66
[58] Field of Search ........................ 251/11, 75, 78, 84; 236/48 R, 68 R; 431/66, 254

[56] References Cited

U.S. PATENT DOCUMENTS

| 3,251,573 | 5/1966 | Miller et al. | 251/78 |
| 3,442,483 | 5/1969 | Schwartz | 251/11 |
| 3,591,138 | 7/1971 | Wolfe | 251/11 |
| 3,819,146 | 6/1974 | Dobson | 251/11 |
| 3,862,820 | 1/1975 | Hantack | 431/66 |
| 4,053,136 | 10/1977 | Perl | 236/68 R |
| 4,067,539 | 1/1978 | Perl | 251/11 |
| 4,102,496 | 7/1978 | Perl | 251/11 |
| 4,142,553 | 3/1979 | Sakakibara et al. | 251/11 |
| 4,508,314 | 4/1985 | Hemme | 251/11 |

Primary Examiner—A. Michael Chambers
Assistant Examiner—John C. Fox
Attorney, Agent, or Firm—Fay, Sharpe, Beall, Fagan, Minnich & McKee

[57] ABSTRACT

A gas valve having a cantilevered bi-metal arm subject to electrically energized heating regulates fluid flow between a fluid inlet and fluid outlet. A poppet is preloaded for seating with a valve seat and further includes a disc member to inhibit valve teasing. Projecting fingers from the arm operatively engage the disc member to provide consistent, repetitive movement between the poppet, arm, and valve seat so that the valve is uniformly opened and closed under various operating parameters.

12 Claims, 6 Drawing Figures

GAS VALVE

BACKGROUND OF THE INVENTION

This invention pertains to the art of electrically energized valves and, more particularly, to such valves employed for controlling flow of gaseous fuel to a burner. The invention is particularly applicable to gas fuel valves employing a thermally actuated bi-metal element that deforms in response to electrically energized heating for opening the valve to permit flow of gaseous fuel to the burner and will be described with particular reference thereto. However, it will be appreciated that the invention has broader applications and may be advantageously employed in other valve environments and applications.

Commonly assigned U.S. Pat. No. 3,862,820 to Hantack, issued Jan. 28, 1975 and hereby incorporated by reference, provides general background for thermally responsive gas valves now widely used in domestic appliances. Briefly, an igniter, preferably formed of a silicon carbide material displaying a decreased resistance with an increase in temperature, is used in the valve assembly. A normally closed, thermally actuated bi-metal valve is placed in series with the igniter. A constant voltage is applied across the igniter and thermally actuated bi-metal valve, and the properties of the igniter offer an initial high resistance so that only a small amount of current flows therethrough. The igniter is heated due to current flow so that the igniter material decreases its resistance and, thus, current flow increases. Once a preselected current is attained, the thermally actuated bi-metal valve will open since the thermally actuated bi-metal valve receives sufficient current. Fuel may then flow to a burner and the igniter is sufficiently hot so that the fuel is ignited. By controlling the amount of current needed to open the valve, a manufacturer can be assured that the igniter is sufficiently hot. That is, if the valve opens, the igniter must be above ignition temperature or, stated another way, the valve will not open due to insufficient current to the thermally actuated bi-metal valve if the igniter has not reached sufficient ignition temperature.

Further advancements in the gas valve field are illustrated by commonly assigned U.S. Pat. No. 4,508,314 to Hemme, issued Apr. 2, 1985 and hereby incorporated by reference. A valve poppet member is held closed against its corresponding valve seat by a combination of gas pressure in the valve chamber and resiliency of a bi-metal arm. The poppet material does not always accommodate the preload of the bi-metal arm. For example, either deformation of the elastomeric material of the poppet around portions of the connection with the arm or tackiness of the elastomeric material can inhibit elastic return of the material upon initial movement of the bi-metal arm. In such instances, the poppet may be caused to move at the onset of movement of the bi-metal arm under thermal actuation and the poppet may be lifted from the valve seat prematurely.

The U.S. Pat. No. 4,508,314 teaches use of a poppet bead in conjunction with a recess cavity that causes the bi-metal arm to thermally deflect a predetermined amount to effect release of the preload of the arm against the poppet member. At this point, valve opening occurs. The poppet bead absorbs the preload exerted by the bi-metal arm so that the poppet does not stick onto the arm. This arrangement insures that the elastomeric material responds elastically upon initial movement of the bi-metal arm.

The above-noted constructions provide consistent and reliable valve operation. Further studies, though, have revealed that the elastomeric poppets do not separate from the valve seat in identical manner each time they open. More particularly, a wide temperature range, for example, for 32° to 500° F., must be compensated for and calibrated in the bi-metal arm. Under such a wide range of temperature exposures, the bi-metal arm is subject to various bent configurations. In prior art structures, the thermally responsive arm has an aperture or cut-out formed at one end for receipt on a neck or shank of the poppet. A radially outward extending flange of the poppet has a predetermined dimension that abuttingly engages the bi-metal arm on an upper end of the neck. Under one set of conditions, the arm assumes a configuration tending to lift the leading edge of the poppet material from the valve seat. Under a second set of conditions, the arm is distorted to a different bent configuration such that the back edge of the poppet material is lifted from the valve seat. These different bent configurations lead to inconsistent valve opening. The poppet material has a tendency to "tease" relative to the valve seat instead of exhibiting a quick action, popping sensation.

It has, therefore, been considered desirable to overcome the bent configuration and inconsistent valve opening processes experienced in prior art devices and achieve a more consistent, reliable operation of the valve. The subject invention is deemed to meet these needs and other.

SUMMARY OF THE INVENTION

In accordance with the present invention, an elastomeric poppet is designed to provide repetitive, consistent opening and closing with respect to the valve seat.

According to another aspect of the invention, an electrically actuated valve assembly includes a housing having a valve chamber, fluid inlet, fluid outlet, and a valve seat defined between the inlet and outlet. Thermally responsive means is mounted on the housing and includes an arm member extending adjacent the valve seat and operative in response to electrically energized heating. A poppet means is received on one end of the arm member for selective sealing engagement with the valve seat. A means for uniform contact engagement between the poppet means and arm member consistently operates the valve assembly under various conditions.

According to another aspect of the invention, the poppet means includes means for mounting a plate member thereon.

According to a further aspect of the invention, the arm member includes at least one outwardly projecting finger having an apex adapted for operative engagement with the plate member.

According to a still further aspect of the invention, the poppet means is mounted on the arm for a predetermined lost-motion movement relative to the poppet means upon movement from a first position to a second position.

A principal advantage of the subject invention resides in the consistent, repetitive opening and closing of the poppet means with respect to the valve seat.

A further advantage of the invention resides in the added weight on the poppet means to eliminate valve teasing.

A further advantage of the subject invention resides in maintaining the contact point between the arm and poppet means within a short distance from the centerline of the poppet.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof, and wherein.

DETAILED DESCRIPTION OF THE PREFERRED EMBODIMENT

Figure 1:
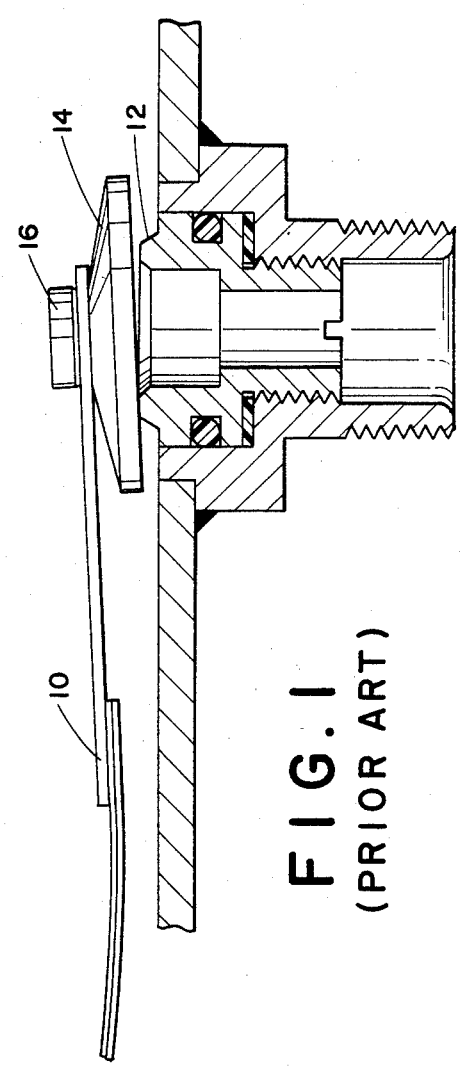
FIG. 1 is a sectional side view of a prior art thermally actuated bi-metal valve illustrating one bent configuration of the arm.
Figure 2:
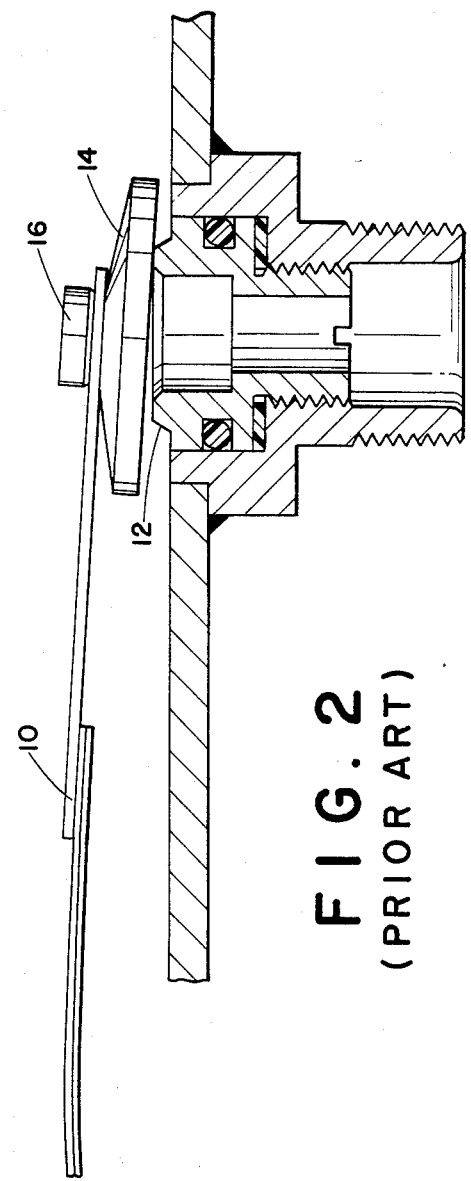
FIG. 2 is a view similar to FIG. 1 illustrating another bent configuration of the bi-metal arm.

Referring now to the drawings wherein the showings are for purposes of illustrating the preferred embodiment of the invention only and not for purposes of limiting same, FIGS. 1 and 2 generally illustrate various bent configurations of the bi-metal arm of prior art gas valves A. In FIG. 1, a valve arm 10 is distorted under an extreme thermal condition so that a leading edge of a poppet member is lifted from a valve seat 12. More particularly, an outer free end of the arm is curved upwardly away from the valve seat 12. The arm includes an aperture or cut-out that is received by a neck portion of poppet member 14. This neck portion includes an overlying flange 16 having a predetermined radial dimension designed to abuttingly engage the arm during valve opening. As shown, the upturned, free end of the arm engages the flange 16 initially and tends to lift the leading edge of the poppet member 14 away from the valve seat. A rear edge of the poppet member remains securely engaged with the valve seat. Further movement of the arm provides progressive engagement between the remainder of the arm and flange to a fully opened valve condition.

Under a different set of conditions, a poppet valve face tends to initially lift from the back or rear edge of the valve seat as shown in FIG. 2. The outer free end of the bi-metal arm 10 is downturned relative to the intermediate portion of the arm. This promotes contact between the rear edge of the flange 16 and the arm during initial movement of the arm. The rear edge of the poppet member is urged from the valve seat 12 prior to the remainder of the poppet member lifting from the valve seat.

A combination of factors may promote the different configuration of the bi-metal arm and the leading or rear edge lifting of the poppet member from the valve seat. For example, the poppet member valve is held in closed sealing relation against the valve seat by a combination of gas pressure and resilient preload exerted by the arm. The bi-metal arm must be compensated for a wide range of temperature exposure. It is not uncommon for a valve of this type to encounter temperatures ranging from 32° F. to 500° F. Accordingly, variations in the opening times of the valve may be associated with these different operating conditions.

Figure 3:
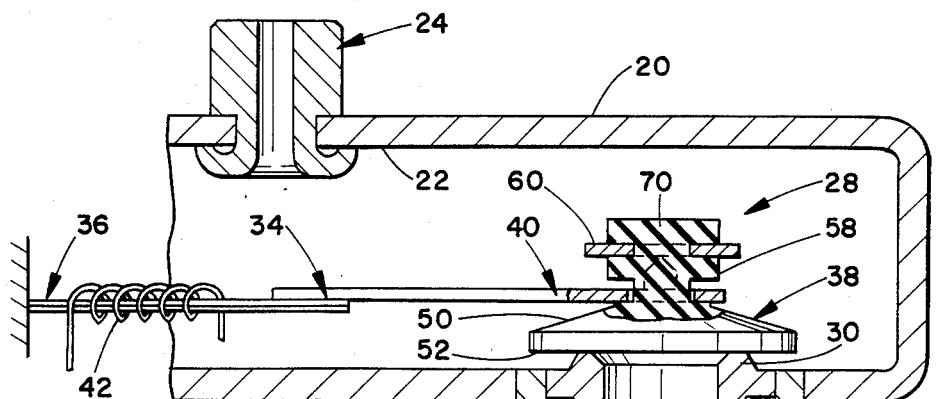
FIG. 3 is a partial cross-sectional view of the valve of the present invention.

In an effort to stabilize the position of the poppet member with respect to its seat, the subject invention, as exhibited in FIG. 3, has been modified to provide consistent, repetitive movement. More specifically, a housing 20 defines an internal valve chamber 22 in communication with a fluid inlet 24 and a fluid outlet 26. The inlet and outlet are in sealed relationship with the valve housing 20 as is well known in the art and have a valve poppet assembly 28 disposed therebetween for operative engagement with a valve seat 30. The valve poppet assembly includes an arm 34 that is fixedly mounted at one end 36 with the valve housing. In the preferred embodiment the arm is cantilever mounted. A resilient poppet member 38 is mounted at a second end 40 of the arm.

Typically, the arm 34 is of bi-metal construction and subject to deflection upon a variation in temperature. The arm is compensated during manufacturing assembly to exert a predetermined preload on the poppet member so that it sealingly engages the valve seat. Thermal actuation of the valve arm 34 is typically provided by a heating coil 42 or similar electrically energized heating. Since the first or mounted arm end 36 provides a cantilevered structure for the valve poppet assembly 28, the thermal response of the arm to an increase in temperature provided by the heating coil overcomes the preload and gas pressure moving the resilient poppet member 38 relative to the valve seat 30.

Figure 4:
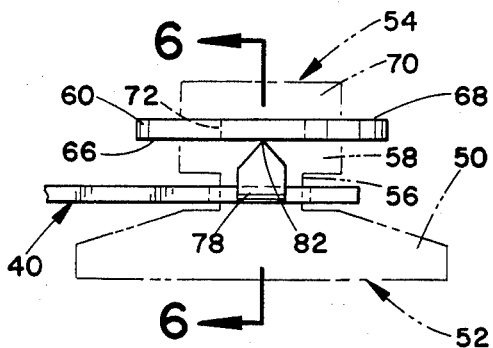
FIG. 4 is an enlarged view of the poppet and arm assembly just prior to opening of the valve member.

With reference to the poppet member and valve arm details of FIG. 4, the resilient poppet member 38 includes a generally conical portion 50 having a sealing surface 52. The conical portion 50 is integrally formed with a neck portion 54 that connects the resilient poppet member with the bi-metal arm. A first recessed groove 56 is adapted to freely receive the arm second end 40. As particularly described in U.S. Pat. No. 4,508,314, as current flows in the heated coil 42 the bi-metal arm 34 deflects upwardly and imparts movement to the free end 40 of the arm relative to the valve seat and resilient poppet member 38. Only a small amount of lost-motion movement is permitted before the arm contacts first flange 58 formed on the neck portion. Further movement of the arm also moves the poppet member relative to the valve seat. In the presently preferred practice, a limited amount of lost-motion movement is still provided between the arm and poppet member 38. Contact, though, between the arm second end 40 and first flange 58 in a manner similar to the embodiment of FIGS. 1 and 2 is prohibited. Instead, the subject invention provides for abutting contact between the arm and an annular disc or plate member 60.

The annular disc member includes a first or lower surface 66 that abuts first flange 58. The annular disc member also includes a second or upper surface 68 that abuts a second flange 70 of the neck portion 54. The first and second flanges 58, 70 define a second recessed groove 72 or mounting means therebetween. Therefore, the annular disc member is closely received in this second groove 72. The annular disc member is preferably formed of a metallic material and adds sufficient weight to the poppet member to maintain uniform contact engagement between the sealing surface 52 and the valve seat 30.

As indicated above, the arm and poppet member are calibrated during manufacturing to exert a predetermined preload against the valve seat. This preload is designed to open the valve at a preselected set of parameters but other conditions may effect the preload so that valve teasing can occur. The added weight provided by the addition of the annular disc member inhibits valve teasing so that the surface 52 remains in sealing contact with the valve seat. In this manner, the valve assembly has a greater tendency to "pop" off the valve seat rather than slowly opening or teasing at either the leading or trailing edge of the poppet assembly.

Figure 5:
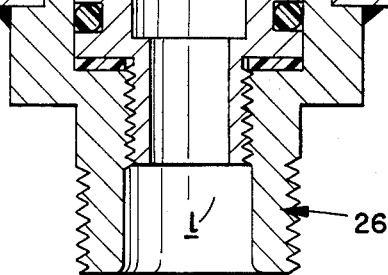
FIG. 5 is a plan view of one end of the valve arm of the present invention; and, FIG. 6 is a cross-sectional view of the arm and poppet generally along the lines 6—6 of FIG. 4.
Figure 5:
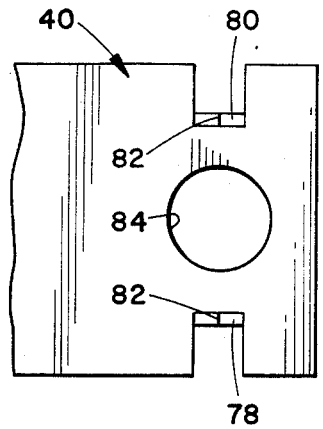
Figure 6:
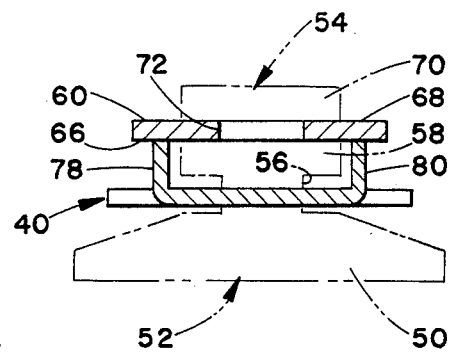

With continued reference to FIG. 4, and additional reference to FIGS. 5 and 6, the bi-metal arm 34 of the valve assembly includes a pair of projecting fingers or outwardly extending projections 78, 80 that are in generally perpendicular relation to the remaining portion of the arm. The fingers 78, 80 may be formed in any convenient manner and, in the particular preferred embodiment, are formed as cut-out portions that are upturned with respect to the arm second end 40. Each finger includes an outermost pointed end or apex 82 that is designed for abutting engagement with the first surface 66 of the annular disc member. As shown, the projecting fingers 78, 80 are positioned on diametrically opposed sides of the neck portion 54, although other arrangements may be used with equal success without departing from the scope and intent of the subject invention.

The arm second end 40 further includes an arcuate cut-out 84 (FIG. 5) having a dimension closely associated with the diameter of first recessed groove 56 on the neck portion. The dimensional relationships are designed to allow limited lost-motion movement of the arm with respect to the resilient poppet member 38 as described above. For example, in FIG. 3 the poppet member is shown in fully seated relationship with the valve seat 30. When the poppet member is fully seated, the bi-metal arm 34 is positioned in the lowermost portion of first groove 56 and engages the conical portion 50. The resilient force provided by the bi-metal arm 34, as well as gas pressure from inlet 24, biases the poppet member into sealing relationship. Upon electrically energized heating of the coil 42, the bi-metal arm deforms as is well known in the art. Relative movement between the arm and poppet member is initially permitted. FIG. 4 particularly illustrates the arm member just as the apexes 82 of the projecting fingers 78, 80 come into abutting contact with the first surface 66 of the annular disc member.

The point contact between the apexes 82 and the first surface 66 is generally along a poppet axis 1 (FIG. 3). In this manner, the centerline of the projecting fingers is always closely aligned with the centerline of the poppet member so that the timing of the valve opening process is always the same. That is, the projecting fingers always contact the metal disc member at approximately the same area.

To assure point contact between the apexes 82 and the valve disc member 60, the projecting fingers 78, 80 extend a predetermined dimension normally outward from the arm. In the valve closed position of FIG. 3, the projecting fingers do not contact the valve member but, in FIG. 4, the fingers engage the disc member and inhibit contact between the planar portion of the arm second end 40 and first flange 58. In this manner, contact between the projecting fingers and disc member is closely adjacent the poppet member axis 1 and the problems associated with the prior art constructions are prohibited. No matter how the arm distorts, contact is always closely adjacent the poppet member axis 1.

The additional weight provided by the annular disc member maintains the poppet member in contact with the valve seat. The poppet member tends to "pop" off the seat rather than undergoing slow, disengaging contact therewith. Incorporation of the projecting fingers and valve disc member prohibits the leading or trailing edge from peeling and moving from the valve seat before the remainder of the poppet member. Instead, the poppet member is lifted from the valve seat closely adjacent its axis each and every time. The timing of the valve opening process is more precise and, accordingly, the gas valve is more consistent and reliable after continued, repetitive use.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is now claimed:

1. An electrically actuated valve assembly comprising:
   a housing having a valve chamber defined therein, a fluid inlet, a fluid outlet, and a valve seat defined between said inlet and outlet;
   a thermally responsive means mounted on said housing and disposed in said valve chamber, said thermally responsive means including an arm member extending adjacent said valve seat and operative in response to electrically energized heating to provide movement of said arm member relative to said valve seat;
   poppet means received by said arm member, said poppet means having a valve face for selective sealing engagement with said valve seat; and,
   means for repetitively and consistently engaging said poppet means, said engaging means operatively associated with said arm member and extending therefrom, whereby the valve assembly is opened uniformly under various operating conditions.

2. The valve assembly as defined in claim 1 wherein said engaging means includes a plate member fixedly mounted to said poppet means.

3. The valve assembly as defined in claim 1 wherein said engaging means contacts said poppet means generally along a poppet axis.

4. An electrically actuated valve assembly comprising:
   a housing having an inlet and outlet and a valve seat therebetween;
   a valve member cooperating with said valve seat for selectively regulating fluid flow from said inlet to said outlet;
   said valve member including an arm extending from said housing at one end and a resilient member at said other end;
   said resilient member having a first surface adapted for sealingly seating on said valve seat, an annular member mounted opposite said first surface, and an arm receiving means disposed therebetween; and, said arm other end including at least one outwardly extending projection selectively engaging said annular member whereby movement of said arm away from said valve seat allows said outwardly extending projection to engage said annular member and move said first surface away from said valve seat.

5. The valve assembly as defined in claim 4 wherein said outwardly extending projection engages said annular member in point contact relation.

6. A valve assembly comprising:
a housing forming a valve chamber therein, a fluid inlet and fluid outlet communicating with said valve chamber, and a valve seat interposed between said inlet and outlet;
an electrically actuated arm having a heating coil operative therewith at one end, said coil adapted for selective current therethrough whereby said arm is heated and deflects from a first position to a second position;
a poppet means at the other end of said arm having a valve face adapted for selective sealing relation with said valve seat, said poppet means including an annular member fixedly received on said poppet means at an area spaced from said valve face in said first position, an intermediate area disposed between said valve face and annular member for receiving said arm other end, and means for providing point contact with said annular member generally along a central axis of the poppet means during movement from said first position to said second position.

7. The valve asembly as defined in claim 6 wherein said arm other end is mounted for predetermined lost-motion movement relative to said poppet means upon movement from said first position to a second position.

8. The valve assembly as defined in claim 6 wherein said contacting means includes an apex extending outwardly from said arm for contact with said annular member for consistent, repetitive movement of said poppet means relative to said valve seat.

9. An electrically actuated valve assembly comprising:
a housing having a valve chamber defined therein, a fluid inlet, a fluid outlet, and a valve seat defined between said inlet and outlet;
a thermally responsive means mounted on said housing and disposed in said valve chamber, said thermally responsive means including an arm member having a first projecting finger, said arm member extending adjacent said valve seat and operative in response to electrically energized heating to provide movement of said arm member relative to said valve seat;
poppet means received by said arm member, said poppet means having a valve face for selective sealing engagement with said valve seat; and,
means for maintaining uniform contact engagement between said poppet means and said arm member, said uniform contact maintaining means including a plate member fixedly mounted to said poppet means and adapted for operative engagement with said first projecting finger whereby the valve assembly is opened consistently under various operating conditions.

10. The valve assembly as defined in claim 9 wherein said arm member includes a second projecting finger adapted for operative engagement with said plate member, said first and second projecting fingers disposed on opposed sides of a poppet means axis.

11. The valve assembly as defined in claim 9 wherein said first projecting finger on said arm member has an outer apex.

12. The valve assembly as defined in claim 9 wherein said means for maintaining uniform contact engagement includes a neck portion formed on said poppet means having a first end operatively receiving an annular disc member thereon.

* * * * *